United States Patent [19]

Langford et al.

[11] 4,092,545
[45] May 30, 1978

[54] MEANS AND METHOD FOR CONTROLLING THE NEUTRON OUTPUT OF A NEUTRON GENERATOR TUBE

[75] Inventors: Obie M. Langford; Harold E. Peelman, both of Houston, Tex.

[73] Assignee: Texaco Inc., New York, N.Y.

[21] Appl. No.: 721,616

[22] Filed: Sep. 8, 1976

[51] Int. Cl.² .............................................. G21G 4/02
[52] U.S. Cl. ..................................... 250/501; 250/502
[58] Field of Search ........................ 250/499, 501, 502

[56] References Cited

U.S. PATENT DOCUMENTS

| | | | |
|---|---|---|---|
| 3,719,827 | 3/1973 | Dennis | 250/502 |
| 3,949,232 | 4/1976 | Langford et al. | 250/501 |
| 3,984,694 | 10/1976 | Dennis | 250/502 |

Primary Examiner—Harold A. Dixon
Attorney, Agent, or Firm—Thomas H. Whaley; Carl G. Ries; Ronald G. Gillespie

[57] ABSTRACT

Means and method for energizing and regulating a neutron generator tube having a target, an ion source and a replenisher includes providing a negative high voltage to the target and monitoring the target current. A constant current from a constant current source is divided into a shunt current and a replenisher current in accordance with the target current. The replenisher current is applied to the replenisher in a neutron generator tube so as to control the neutron output in accordance with the target current.

9 Claims, 1 Drawing Figure

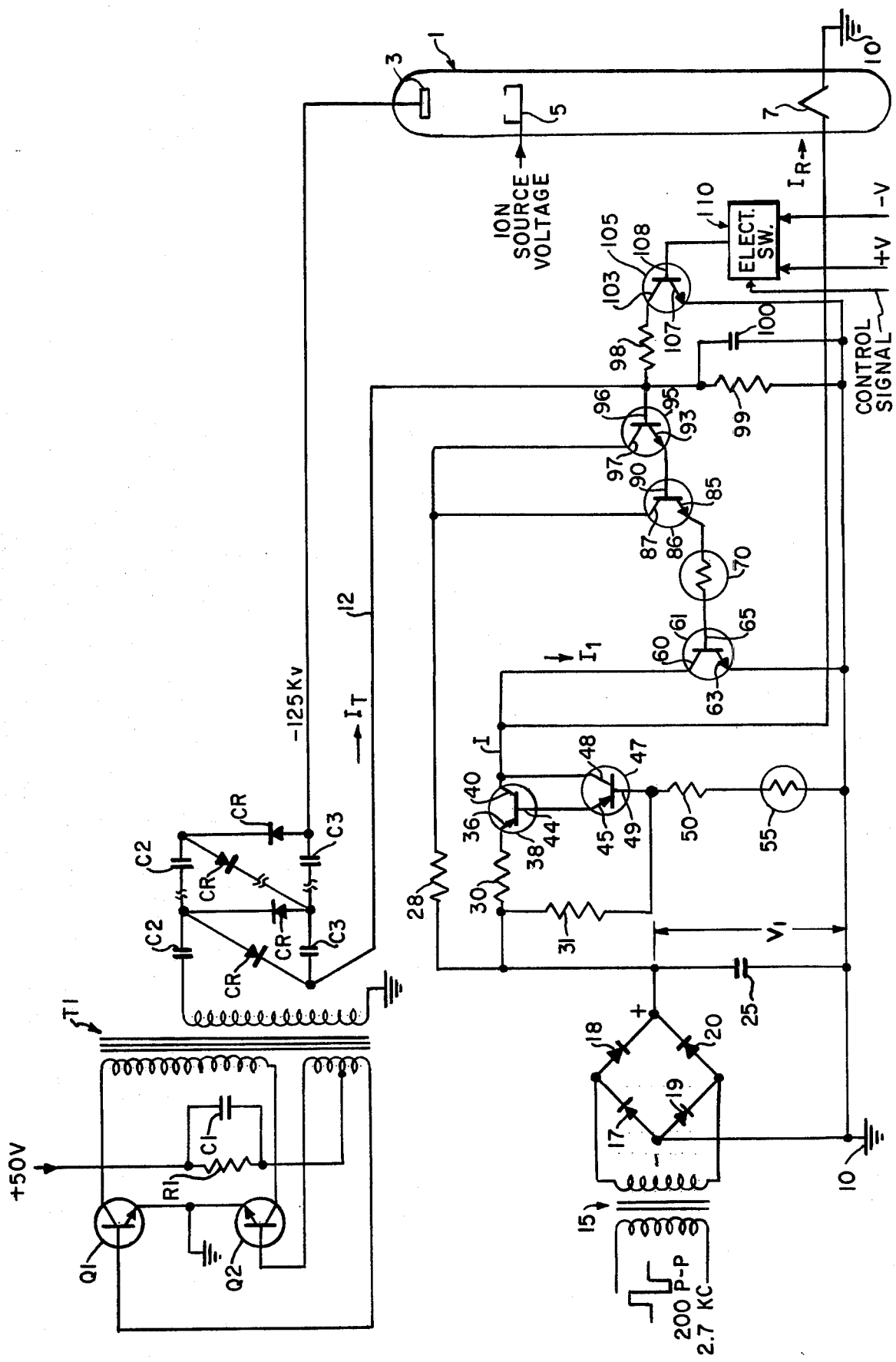

MEANS AND METHOD FOR CONTROLLING THE NEUTRON OUTPUT OF A NEUTRON GENERATOR TUBE

BACKGROUND OF THE INVENTION

1. Field of the Invention

The present invention relates to control or regulating circuits in general and, more particularly, to control or regulating circuits and methods for neutron generating tubes.

2. SUMMARY OF THE INVENTION

A gas filled neutron tube in a nuclear well logging tool has a target an ion source voltage and a replenisher connected to ground. A negative high voltage is applied to the target by a power supply also providing a target current corresponding to the neutron output of the neutron generator tube. A constant current source provides a constant current. A network receiving the target current and the constant current provides a portion of the constant current as a replenisher current which is applied to the replenisher in a neutron generating tube. The network controls the magnitude of the replenisher current in accordance with the target current so as to control the neutron output of the neutron generating tube.

The objects and advantages of the invention will appear more fully hereinafter from a consideration of the detailed description which follows, taken together with the accompanying drawing, wherein one embodiment of the invention is illustrated by way of example. It is to be expressly understood, however, that the drawing is for illustrative purposes only and is not to be construed as defining the limits of the invention.

DESCRIPTION OF THE DRAWING

The FIGURE is a schematic drawing of a neutron generator tube with associated control and regulating circuits constructed in accordance with the present invention.

DESCRIPTION OF THE INVENTION

The present invention regulates a continuous or apulsed neutron source by controlling the replenisher current in the replenisher section of a neutron generating tube. Referring to the FIGURE, the three primary functional elements of a neutron generating tube in a nuclear well logging tool (not shown) are a target 3, an ion source 5 and a replenisher 7. Replenisher 7 is connected to ground 10. For a neutron tube such as Amperex 18603, target 3 normally operates at a $-125$ kv which is used to accelerate a gas mixture of deuterium and tritium ions to the titanium-tritium target 3. Ion source 5 in the Amperex tube, operates at approximately 1600 volts, ionizes the gas mixture and focuses to the accelerating area. Replenisher 7 regulates the gas pressure at a constant level by controlling the temperature of a metal cylinder (not shown) in the replenisher 7 of neutron tube 1. Replenisher 7 is operated by allowing 2.5 to 4.5 amps of replenisher current to flow in this section. The FIGURE also shows an energizing and regulating circuit located in the well logging tool.

The $-125$ kv target voltage is generated by a conventional type Cockroft-Walton type high voltage power supply when 50 volts DC is applied to the driver circuit. The high voltage power supply includes NPN transistors Q1 and Q2, transformer T1, Resistor R1, capacitor C1, capacitors C2, C3 and diodes CR. It should be noted that the breaks in relation to the second segment of the capacitance diode network indicate that there are more sections which are not shown for convenience. Since the Cockroft-Walton power supply is of a conventional type, the details of which are not essential to an understanding of the present invention, it is sufficient to say that it provides $-125$ kv to target 3 and a line 12 carries a current $I_T$ corresponding to the target current. The target current $I_T$ corresponds to the neutron output of tube 1.

A 200 volt peak to peak at 2.7kH square wave voltage is applied to a transformer 15 which steps the square wave voltage down to provide a reduced square wave voltage to a full wave rectifier bridge comprising diodes 17, 18, 19 and 20. A filtering capacitor 25 is connected between the positive output of the full wave rectifier bridge and ground 10. The negative output of the full wave rectifier bridge is connected to ground 10. The type of circuit just described provides a constant current I as long as a voltage $V_1$ across capacitor 25 is constant.

The positive output of the full wave rectifier bridge is also connected to an emitter 36 of a PNP transistor 38 having a collector 40 and a base 44. When properly biased collectors 40 and 48 of transistors 38 and 47, respectively, provide a constant current. Base 44 of transistor 38 is connected to an emitter 45 of another PNP transistor 47, having a collector 48 and a base 49. Base 49 of transistor 47 is connected to resistor 31 and to another resistor 50. The other end of resistor 50 is connected to ground through a sensistor 55, whose resistance varies in accordance with temperature, so as to provide temperature compensation downhole.

Collector 40 of transistor 38 is connected to a collector 60 of an NPN transistor 61 having an emitter 63 connected to ground 10 and a base 65 connected to a sensistor 70, which also provides downhole temperature compensation.

Sensistor 70 is connected to an emitter 85 of a NPN transistor 86 having a collector 87 connected to resistor 28 and a base 90. Base 90 of transistor 86 is connected to an emitter 93 of a transistor 95 having a base 96 and a collector 97 connected to collector 87 of transistor 86. Base 96 of transistor 95 is connected to line 12, resistors 98, 99 and a capacitor 100. The opposite ends of resistor 99 and capacitor 100 are connected to ground 10 while the opposite end of resistor 98 is connected to a collector 103 of a NPN transistor 105 having an emitter 107 connected to ground 10 and a base 108 connected to an electronic switch receiving a $+V$ D.C. voltage, a $-V$ D.C. voltage and a control signal. Switch 110 passes either the $+V$ or the $-V$ voltage in accordance with amplitude of the control signal.

Collector 40 of transistor 38 is connected to replenisher 7 of tube 1 and provides the replenisher current $I_R$ to replenisher 7.

CONTINUOUS OPERATION MODE

Initially, as tube 1 is first turned on by means not shown, the $-125$ kv is slowly applied to target 3. After approximately $-40$ kv is applied to target 3 for focusing of existent ions in the tube, the 1600 volt ion source voltage and replenisher current are applied to ion source 5 and replenisher 7, respectively. Due to the time required to ionize the gas mixture, the gas pressure in the tube is minimized when the ion source voltage appears. After approximately 4 amperes of replenisher current heating replenisher 7 for 3 to 5 minutes, the gas pressure in tube 1 increases causing target current $I_T$ to flow.

During the time the replenisher current $I_R$ is heating replenisher 7, $I_T$ is zero and I equals the replenisher current $I_R$ because of a voltage which appears across base 96 of transistor 95 and ground 10 is zero and no collector current I can flow in transistor 61. As tube 1 starts to operate, target current $I_T$ increases causing voltage $V_2$ to increase from zero. As the voltage at base 96 of transistor 95 increases, transistor 95 is turned on causing in turn transistor 86 to turn on so that there is current flow through resistor 28 and transistor 86 to sensistor 70. The current through sensistor 70 turns on transistor 61. As a result, transistor 61 conducts some of the constant current I, in accordance with the magnitude of voltage $V_2$, to ground 10 in the form of current I which in turn affects the magnitude of the replenisher current $I_R$. Voltage $V_O$ at base 96 of transistor 95 corresponds to the target current $I_T$.

When the turn on period for tube 1 is completed, the neutron output is kept constant by continuously monitoring the target current $I_T$ and changing the gas pressure in tube 1 by varying replenisher current $I_R$. The desired target current $I_T$ is controlled by the resistance values of resistors 98, 99. For continuous mode operation resistors 99 and 98 are in parallel because switch 110 is rendered conductive by the control signal to pass the +V voltage to base 108 causing transistor 105 to conduct, thereby connecting resistor 98 to ground 10.

PULSED MODE

The operation in the pulsed mode is the same as in the continuous mode except that the voltage at base 96 of transistor 95 is generated differently. For the pulsed mode, tube 1 operates with a maximum duty cycle of 10 percent which means the peak of target current $I_T$ is a factor ten times higher when the tube is on. Therefore, target current $I_T$ is detected as a pulsed current. However, by means of an appropriate time constant for a given repetition rate capacitor 100 is kept charged to a constant voltage level. Switch 110 is activated to apply the negative voltage to the base 108 of transistor 105 rendering transistor 105 non-conductive and removes resistor 98 from the circuit. Therefore, the pulsed mode target current $I_T$ is detected by resistor 99. The average value of target current can be changed by varying the resistance valve of resistor 99. Normally, the continuous and the average pulsed mode target currents are made equal which is normally the maximum output of tube 1.

The present invention as hereinbefore described regulates a continuous or a pulsed neutron source by controlling the replenishing current through the replenishment section of the neutron generated tube.

What is claimed is:

1. An energizing and regulating circuit for a gas filled neutron generator tube is a nuclear well logging tool having a target, an ion source receiving an ion source voltage and a replenisher connected to ground, comprising power supply means connected to the target in the neutron generator tube for providing a negative high voltage to the target and for providing a target current corresponding to the neutron output of the neutron generator, energy means for providing a constant current, and means connected to the power supply means, to the replenisher in the neutron generator tube and to the energy means for providing a portion of the constant current to the replenisher as a replenisher current in accordance with the target current so as to control the neutron output of the neutron generator tube.

2. A circuit as described in claim 1 in which the replenisher current means includes dividing means for shunting a portion of the constant current to ground as a shunt current in accordance with the target current and for providing the remaining portion of the constant current as the replenisher current.

3. A circuit as described in claim 2 in which the target current may either be a continuous target current when the neutron generator tube is operated in a continuous mode or a pulsed target current having pulses of current when the neutron generator tube is operated in a pulsed mode, and the dividing means includes voltage means for providing an average bias voltage in accordance with pulses of target current when the neutron generator tube is operated in pulsed mode and a bias voltage in accordance with a continuous target current when the neutron generator tube is operated in a continuous mode.

4. A circuit as described in claim 3 in which the voltage means includes switching means receiving a positive D.C. voltage and a negative D.C. voltage for passing the positive voltage while blocking the negative voltage when the neutron generator tube is operated in the continuous mode and for passing the negative volta e while blocking the positive voltage when the neutron generator tube is operated in the pulsed mode, a first NPN transistor having a collector, an emitter connected to ground, and a base connected to the switching means and receiving a voltage passed by the switching means, said first transistor being rendered conductive by a positive voltage from the switching means so as to substantially connect its collector to ground and being rendered nonconductive by a negative voltage so as to substantially disconnect its collector from ground, first conductive means connected to power supply means for conducting the target current, a first resistor having a predetermined resistance value being connected between the conductive means and the collector of the first transistor so that when the first transistor is rendered conductive the first resistor connects the conductive means to ground and does not connect the conductor means to ground when the first transistor is not conductive, a second resistor having a predetermined resistance and a common connection with the conductive means and the first resistor and said second resistor being also connected to ground, and a capacitor connected between the common connection of the conductive means, the first and second resistors and to ground so that when the first transistor is rendered conductive the bias voltage appears at the common connection that corresponds to the continuous target current while the bias voltage appearing at the common connection when the first transistor is not rendered conductive corresponds to the average pulsed target current.

5. A circuit as described in claim 4 in which the energy means also provides a voltage and the dividing means includes a second NPN transistor having a collector connected to the energy means receiving the constant current, an emitter connected to ground and a base, a sensistor connected to the base of said second transistor; a third NPN transistor having a collector receiving the voltage from the energy means, an emitter connected to the sensistor and a base; a fourth NPN transistor having a collector receiving the voltage from the energy means, an emitter connected to the base of the third transistor, and a base connected to the common connection in the voltage means so that the bias voltage controls the operation of the second through fourth transistors resulting in a portion of the constant current being shunted to ground as the shunt current, said shunt current corresponding to the target current; and second conductive means connected to energy means and the replenisher in the neutron generator tube for the conducting the remaining portion of the constant current to the replenisher as replenisher current corresponding to the target current.

6. A circuit as described in claim 5 in which the energy means includes D.C. voltage means for providing a substantially stable D.C. voltage with respect to ground, a third resistor, having a predetermined resistance, connected to the D.C. voltage means and to the collectors of the third and fourth transistors for providing a D.C. voltage to the third and fourth transistors, fourth and fifth resistors having predetermined resistances and a common connection to the D.C. voltage means; a fifth transistor, which is of the PNP type, having an emitter connected to the fourth resistor, a collector connected to the collector of the second transistor and a base; a sixth transistor, which is of the PNP type, having an emitter connected to the base of the fifth transistor, a collector connected to the collectors of the second and fifth transistors and a base connected to the fifth resistor; a sixth resistor and a second sensistor serially connected between the base of the sixth transistor and ground so that the fifth and sixth transistors are energized to provide the constant current to the collector of the second transistor and the second conductive means.

7. A method for energizing the regulating a gas filled neutron generator tube in a nuclear well logging tool having a target, an ion source receiving an ion source voltage and a replenisher connected to ground, which consists of providing a negative high voltage to the target, providing a target current corresponding to the neutron output of the neutron generator tube, providing a constant current and providing a portion of the constant current to the replenisher as a replenisher current in accordance with the target current so as to control the neutron output of the neutron generator tube.

8. A method as described in claim 7 in which the replenisher current porividing step includes shunting a portion of the constant current to ground as a shunt current in accordance with the target current and providing the remaining portion of the constant current as the replenisher current.

9. A method as described in claim 8 in which the target current may be either a continuous target current when the neutron generator tube is operated in a continuous mode or a pulsed target current having pulses of current when the neutron generator tube is operated in a pulsed mode; and the steps of providing a shunt current includes providing an average bias voltage in accordance with pulses of target current when the neutron generator tube is operated in a pulse mode, and providing a bias voltage in accordance with the continuous target current when the neutron generator tube is operated in a continuous mode, and controlling the magnitude of the shunt current in accordance with the average bias voltage when the neutron generator tube is operated in a pulsed mode, or with the bias voltage when the neutron generator tube is operated in a continuous mode.

* * * * *